(12) United States Patent
Rouvinen (10) Patent No.: US 11,528,344 B2
(45) Date of Patent: Dec. 13, 2022

(54) ELIMINATION OF LATENCY IN A COMMUNICATION CHANNEL

(71) Applicant: AIRO FINLAND OY, Helsinki (FI)

(72) Inventor: Jarmo Tapio Rouvinen, Helsinki (FI)

(73) Assignee: AIRO FINLAND OY, Helsinki (FI)

( * ) Notice: Subject to any disclaimer, the term of this patent is extended or adjusted under 35 U.S.C. 154(b) by 0 days.

(21) Appl. No.: 16/610,277

(22) PCT Filed: May 2, 2017

(86) PCT No.: PCT/FI2017/050335
§ 371 (c)(1),
(2) Date: Nov. 1, 2019

(87) PCT Pub. No.: WO2018/202934
PCT Pub. Date: Nov. 8, 2018

(65) Prior Publication Data
US 2020/0145517 A1    May 7, 2020

(51) Int. Cl.
*H04L 69/163*  (2022.01)
*H04L 1/16*    (2006.01)
*H04L 5/00*    (2006.01)
*H04L 47/193*  (2022.01)

(52) U.S. Cl.
CPC ........... *H04L 69/163* (2013.01); *H04L 1/16* (2013.01); *H04L 5/0055* (2013.01); *H04L 47/193* (2013.01)

(58) Field of Classification Search
None
See application file for complete search history.

(56) References Cited

U.S. PATENT DOCUMENTS

| | | |
|---|---|---|
| 2009/0201813 A1 | 8/2009 | Speight |
| 2013/0155938 A1 | 6/2013 | Smith |
| 2014/0012981 A1* | 1/2014 | Samuell ............... H04L 47/40 709/224 |
| 2014/0064119 A1* | 3/2014 | Iizuka ............... H04L 43/0829 370/252 |
| 2014/0082180 A1* | 3/2014 | Mutoh ............... H04L 47/193 709/224 |

(Continued)

OTHER PUBLICATIONS

International Search Report for PCT/FI2017/050355 dated Jan. 24, 2018.

(Continued)

*Primary Examiner* — Adnan Baig
(74) *Attorney, Agent, or Firm* — Thomas | Horstemeyer, LLP (57) ABSTRACT

The present invention relates to a method for controlling a communication of a first communicating device to a second communicating device over a communication network, the method comprises: monitoring data traffic to the communication network from the first communication device, in response to detection of at least one predetermined piece of information generating an acknowledgment complying a communication protocol used for the communication, and transmitting the generated acknowledgement to the first communication device for indicating a delivery of the data traffic to the second communicating device. The invention also relates to a network device and a computer program product.

15 Claims, 3 Drawing Sheets

(56) References Cited

U.S. PATENT DOCUMENTS

2016/0189124 A1* 6/2016 Park ................. H04M 15/47
   705/40
2017/0155642 A1* 6/2017 Kobayashi ............. H04L 63/02
2018/0115574 A1* 4/2018 Ridley ................. G06F 21/572
2018/0183816 A1* 6/2018 Kawasaki ........... H04L 63/1408

OTHER PUBLICATIONS

Written Opinion of the International Preliminary Examining Authority for PCT/FI2017/050355 dated Feb. 27, 2019.
International Preliminary Report on Patentability for PCT/FI2017/050355 dated Jul. 30, 2019.

* cited by examiner

ELIMINATION OF LATENCY IN A COMMUNICATION CHANNEL

CROSS-REFERENCE TO RELATED APPLICATIONS

This application is the 35 U.S.C. § 371 national stage application of PCT Application No. PCT/FI2017/050335, filed May 2, 2017, which is herein incorporated by reference in its entirety.

TECHNICAL FIELD

The invention concerns in general the technical field of data communication. More particularly, the invention concerns a solution for improving an operation of a communication network.

BACKGROUND

Different communication protocols are developed for enabling efficient communication between devices coupled to a communication network. The Internet protocol suite is a widely used protocol suite for transmitting data over the Internet network. Specifically, the Transmission Control Protocol (TCP) being part of the Internet protocol suite is a connection-oriented protocol which refers to an implementation in which a connection is established before any data is sent and upon completion of the transmission of data the connection is terminated. Such a TCP based session may e.g. be established between a client device and a web server.

Figure 1:
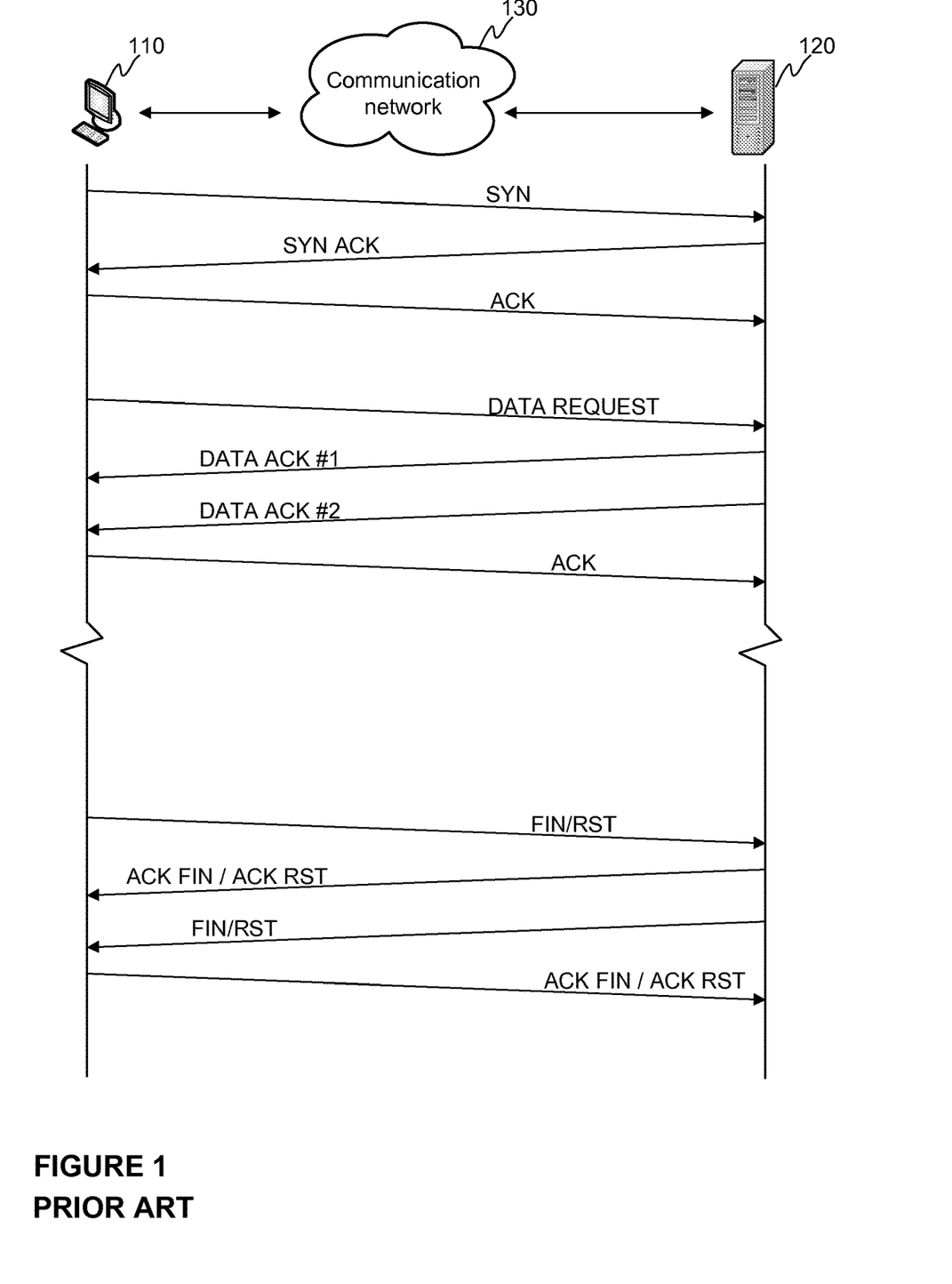
FIG. 1 schematically illustrates a communication session between a client device and a server over a communication network with a TCP connection according to prior art.

In FIG. 1 it is schematically illustrated a communication session between a client device 110 and a server 120 over a communication network 130 with a TCP connection according to prior art. First a session is established and the server 120 and the client device 110 agree upon sequence and acknowledgment numbers during the connection establishment. The end requesting the session establishment (i.e. the client device 110 in FIG. 1) sends a SYN segment specifying the port number of the server 120 that the client device 110 wants to connect to and an initial sequence number of the client device 110. The server responds with its own SYN segment comprising the server's initial sequence number. The server 120 also acknowledges the client device's SYN. According to TCP procedure the client device 110 must acknowledge the SYN segment received from the server 120. In response to an accomplishment of this "handshake procedure" the communication session is established and the parties, i.e. the client device 110 and the server 120, may start sending data to each other.

The sending of data may e.g. be initiated by the client device 110 by sending a data request to the server 120. The data request may carry parameters, such as acknowledgement number and window information defining a number of bytes the server 120 may send before it receives an acknowledgement from the client device 110. In the example of FIG. 1 the server 120 sends the requested data in two segments referred with DATA ACK #1 and DATA ACK #2 in FIG. 1.

The parties may continue the sending of data until a party wants to close the connection. In the example of FIG. 1 the party is the client device 110 which sends FIN (finish) or RST (reset) segment to the server 120. The server 120 acknowledges the receipt of FIN segment and may send its own FIN segment when an application in the server 120 end is closed. The client device 110 acknowledges the receipt of the FIN segment from the server 120.

As may be seen from the above the operation of TCP protocol is based on an idea that the communication parties acknowledge to each other the communication received by them. Fundamentally thinking the next sending of data cannot be initiated, also taking into account TCP receive buffer defined in TCP Receive window size information, until a receipt of the previous sent data is acknowledged. However, the described communication mechanism may cause latency in the communication especially in situations in which the communicating parties reside distantly, e.g. 1-100 km, from each other. For example, consider that situation in which the communicating parties reside 100 km from each other and both parties acknowledge a receipt of data in both communication directions during the data exchange. The problem cannot be solved even if the bandwidth of a communication channel is increased, because the limiting factor, and one source of latency, is the TCP mechanism itself.

Hence, there is need to develop solution which mitigate the drawbacks of the existing situation at least in part.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method and a network device for controlling a communication of a first communication device to a second communication device. Another objective of the invention is that the method and the network device for controlling a communication optimize the communication between the communicating entities.

The objectives of the invention are reached by a method and a network device as defined by the respective independent claims.

According to a first aspect, a method for controlling a communication of a first communication device to a second communication device over a communication network is provided, the method comprises: monitoring, by a network device residing at an end of the first communication device, data traffic to the communication network from the first communication device; in response to detection of at least one predetermined piece of information in at least one data frame in the data traffic generating by a network device residing at an end of the first communication device, an acknowledgment complying a communication protocol used for the communication; and transmitting the generated acknowledgement to the first communication device for indicating a delivery of the data traffic to the second communication device.

The at least one predetermined piece of information may be at least one value of at least one data field in the at least one data frame.

The detection may be performed by comparing the at least one value of the at least data field to at least one comparison value and in response to detection that the at least one value corresponds to the comparison value, the detection is indicated.

An acknowledgement generated by the second communication device in response to a receipt of data traffic from the first communication device may be detected, by the network device, from a data traffic intended to the first communication device. The acknowledgement generated by the second communication device may be filtered out from the data traffic intended to the first communication device.

According to a second aspect, a network device for controlling a communication of a first communication device to a second communication device over a communication network is provided, wherein the network device comprises: at least one processor; at least one memory including computer program code; the at least one memory and the computer program code configured to, with the at least one processor, cause the network device to perform: monitor data traffic to the communication network from the first communication device; generate, in response to detection of at least one predetermined piece of information in at least one data frame in the data traffic, an acknowledgment complying a communication protocol used for the communication; and transmit the generated acknowledgement to the first communication device for indicating a delivery of the data traffic to the second communication device.

The network device may be configured to perform the detection by comparing at least one value of the at least data field to at least one comparison value and in response to detection that the at least one value corresponds to the comparison value to indicate the detection.

The network device may be configured to detect an acknowledgement generated by the second communication device in response to a receipt of data traffic from the first communication device from a data traffic intended to the first communication device. The network device may also be configured to filter out the acknowledgement generated by the second communication device from the data traffic intended to the first communication device.

According to a third aspect, a computer program product comprising at least one computer-readable storage medium having computer-executable program code instructions stored therein is provided for performing the method as described when the computer program product is executed on a computer.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 2:
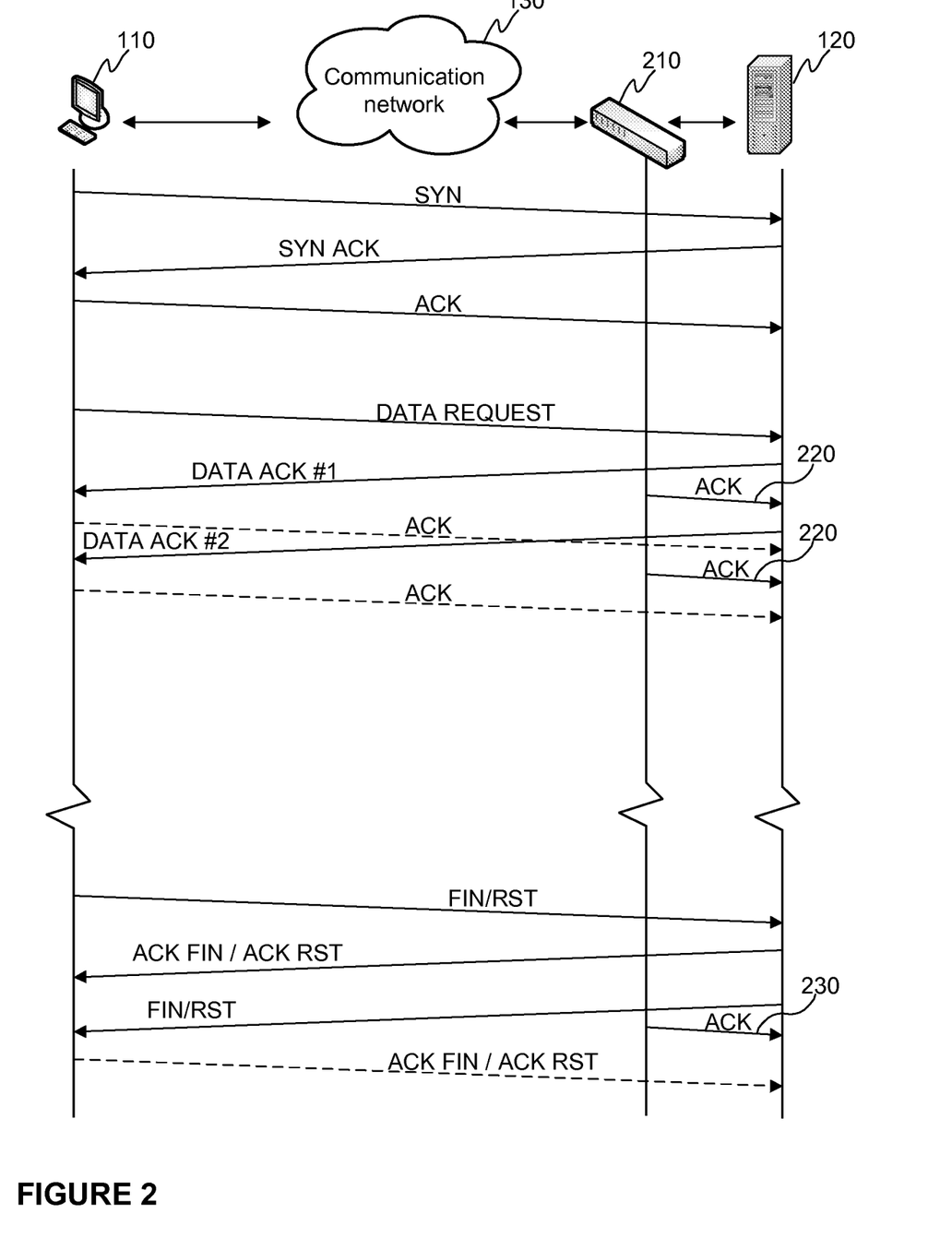
FIG. 2 schematically illustrates a communication session between a first communication device and a second communication device according to an embodiment of the invention.

The present invention relates to a solution for controlling a communication of a first communication device to a second communication device over a communication network so that the communication may be accelerated. In FIG. 2 it is illustrated an example of a communication environment according to an embodiment of the invention by means of which at least some aspects of the present invention may be described. The communication environment may comprise a client device 110 as a second communication device, a communication network 130, such as Internet, a network device 210 and a server 120 as a first communication device. For describing the at least some aspects of the invention the client device 110 and the server 120 may be caused to communicate with each other over TCP protocol, and the network device 210 may be configured to operate at the server 120 end for controlling the communication so that latency in the communication channel may be decreased between the client device 110 and the server 120. The implementation illustrated in FIG. 2 aims to reduce the latency especially in a traffic directed from the first communication device, i.e. the server 120, to the second communication device, i.e. the client device 110. However, the same inventive idea may be applied at the client device 110 end by adding a network device to the client device 110 end in a similar manner as shown in FIG. 2 as regards to the server 120 end. It is necessary to understand that the FIG. 2 does not necessarily illustrate all necessary devices or functionalities to enable the communication between the communicating parties over TCP. Further, in order to describe at least some aspects of the present invention the network device is represented as a separate device, but is shall also be understood as a function implemented in any applicable network entity for performing the tasks according to the present invention, as will be described.

For describing the invention a communication session is established and the server 120 and the client device 110 agree upon sequence and acknowledgment numbers during the connection establishment. The end requesting the session establishment (i.e. the client device 110 in FIG. 2) sends a SYN segment specifying the port number of the server 120 that the client device 110 wants to connect to and an initial sequence number of the client device 110. The server responds with its own SYN segment comprising the server's initial sequence number. The server 120 also acknowledges the client device's SYN. According to TCP procedure the client device 110 also acknowledges the SYN segment received from the server 120. In response to an accomplishment of this "handshake procedure" the communication session may be established and the parties, i.e. the client device 110 and the server 120, may start sending data to each other. Up to this the network device 210 may be configured to pass the signaling relating to the session establishment through it.

Next, the client device 110 may request data from the server 120 through the network device 210 in the example of FIG. 2. The server 120 obtains the requested data and transmits to the client device 110 through the network device 210 in the TCP data frame (DATA ACK #1 in FIG. 2). In response to the detection by the network device 210 that the server 120 returns the requested data to the client device 110 the network device 210 is configured to acknowledge 220 the transmittance of the data to the server 120, which enables the server 120 to initiate a delivery of the next data frame to the client device 120 sooner than by waiting for the acknowledgement from the client device 110 locating distantly from the server 120. This is schematically illustrated in FIG. 2 in which the server 120 may initiate the delivery of the next data frame referred with DATA ACK #2 in response to receipt of the ACK 220 from the network device 210. Again, when the next data frame is transmitted from the server 120 to the client device 110 it is detected by the network device 210 and the next acknowledgement 220 may be given to the server 120 by the network device 210. The same procedure may be continued until the data is to be transmitted and as a result the transfer of data may be accelerated.

Naturally, the client device 110 acknowledges the receipt of data to the server 120 in e.g. in signals DATA ACK #1 AND DATA ACK #2 with ACK signals (illustrated as dashed arrows in FIG. 2) according to the TCP procedure. The server 120 may be configured to cancel the acknowledgments e.g. by either filtering out from the received communication or by perform no operation (NOP) in case of receipt such a duplicate acknowledgement, as the server 120 has already received the corresponding acknowledgments from the network device 210. According to an embodiment of the invention the network device 210 may be configured to detect the acknowledgement relating to the data delivery from the data traffic received from the client device 110 and filter them out from the data traffic delivered to the server 120. This may reduce the signaling ending up to the server 120 and resources may be saved as a whole as regards to the communication parties. The canceling of the acknowledgements, as described above, by the network device 210 may be arranged when the data traffic goes through or mirrored to the network device 210.

Correspondingly, as illustrated schematically in FIG. 2, the network device 210 may be configured to generate the acknowledgement to outbound data traffic from the server 120 relating to finishing the established connection. In order to finish the connection the client device 110 may request finishing the connection by sending a FIN or RST packet, which is acknowledged by the server 120 (ACK FIN or ACK RST). When the server 120 finalizes a closing of application it generates a FIN or RST packet and transmits it to the client device 110. The network device 210 may be configured to detect the transmit of the FIN or RST packet from the server 120 to the client device 110 and to generate acknowledgement (ACK) 230 for the FIN packet and in that manner to accelerate the closing of the connection. As shown in the FIG. 2 the client device 110 also acknowledges (ACK FIN) the receipt of FIN packet (the arrow shown with dashed line), which may end up to the server 120 and the server 120 may be configured to take no actions with respect to it and cancel the acknowledgement in such a manner. According to another embodiment of the invention the network device 210 may be configured to filter the acknowledgement and in that manner prevent unnecessary communication to the server 120 and in this manner improving the security of the server 120.

The mechanism as described differs from the normal operation of TCP protocol, in which all TCP SYN, TCP FIN and TCP RST packets shall be passed through due to operation of security devices, such as firewalls, according to the TCP specification. The same applies to TCP transmission byte acknowledgement requests and sequence acknowledgement requests, i.e. sack requests, and replies are also passed through bi-directionally.

Furthermore, the acknowledgement procedure by the network device 210 according to the invention may be implemented with respect to any other TCP protocol related packet than already described. For example, the network device 210 may be configured to generate the corresponding acknowledgement when the client device 110, or the server 120, requests resetting the connection and the server 120 generates signaling in this respect. The acknowledgement by the network device 210 in the context of resetting the connection accelerates the procedure.

Some aspects of the present invention is so far described by referring to the implementation of an embodiment of the invention in which functionalities relating to the invention are implemented to a network device 210 through which data traffic is arranged to travel. However, the network device 210, or at least the functionality of it, may also be implemented in another embodiment of the invention so that the data traffic is not arranged to travel through the network device 210, but it is arranged in parallel to the traffic channel. The network device 210 may be configured to monitor the data traffic and to generate the acknowledgements to the server 120 in the same manner as described above. The monitoring of the data traffic may e.g. be implemented so that the network device 210 is coupled to an applicable connection point of a device residing in the communication channel, such as a predetermined port in a switch. The predetermined port may e.g. be span or mirror or port monitor in the switch. Moreover, the network device 210 may be arranged to monitor the data traffic in any other network element, such as a routing device, arranged so that it may access the data traffic in the communication channel.

At least some aspects relating to the invention are disclosed in the above given description in a communication environment in which a network device 210 is arranged at the server 120 end for performing at least some operations relating to TCP procedure. However, the similar arrangement may be implemented at the client end 110, wherein the network device 210 may perform the corresponding operations towards at least one client device 110 and in that manner accelerate the communication over the TCP. In some embodiment of the invention the network device 210 as described may be arranged at both ends of the communication, which arrangement may accelerate the communication remarkably as the TCP acknowledgements are generated and delivered locally to the both transmitting ends.

Figure 3:
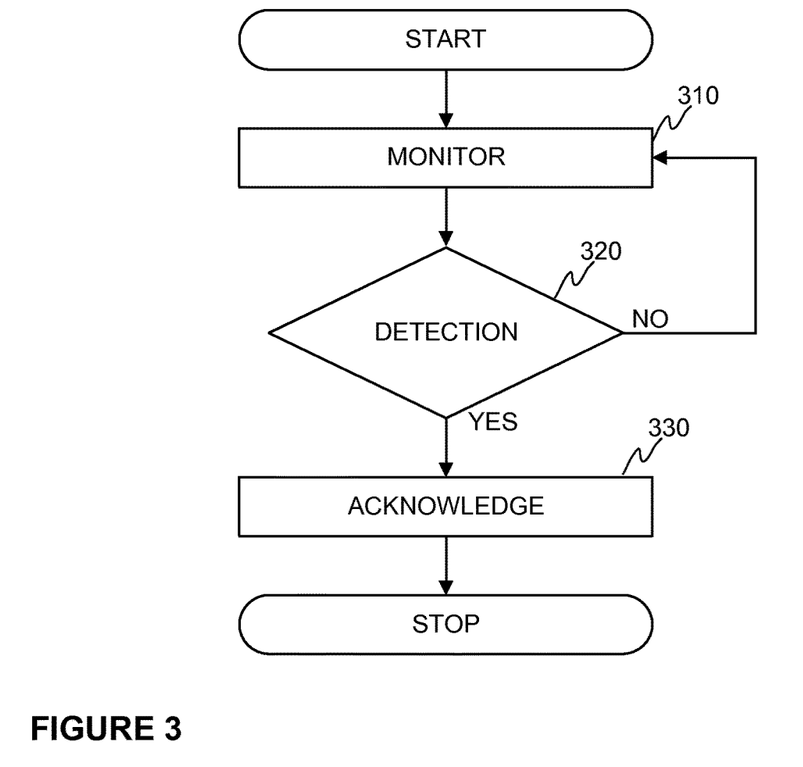
FIG. 3 schematically illustrates a method according to an embodiment of the invention.

FIG. 3 illustrates schematically at least some method steps which may be performed in a solution according to an embodiment of the invention. The entity performing the method steps may e.g. be the network device 210 as described. The method may be implemented as a continuous process in the network device 210.

Regarding steps 310 and 320:

In step 310 the network device 210 may be configured to monitor 310 data traffic at least from an entity to which it is arranged to generate acknowledgements according to the inventive idea of the present invention. The monitoring may be implemented so that the network device 210 is arranged in the communication channel between the entities being involved in the communication and the data traffic is arranged to travel through the network device 210. The network device may be configured to perform the monitoring so that it compares information in the data frames in the data traffic to predetermined parameters stored in a memory accessible by a processing unit of the network device 210 and if a match is found, i.e. detection is made 320, a predetermined procedure is initiated. If no detection is made the monitoring 310 is continued.

As mentioned, the detection may be based on a comparison of information obtained from data traffic to predetermined parameters. For example, first a source network address may be selected into which the TCP ACK return according to the invention may be locally generated. Then it is possible to base the detection to TCP DATA frames received from the source network address. More specifically, it is possible to arrange so that only such TCP DATA frames are detected which have data fields, i.e. flags, with predetermined values. For example, only those TCP DATA frames are detected wherein ACK value and/or PUSH value correspond to some predetermined comparison value, such as "true". In response to the detection of such frames it may be calculated how much it contains payload data, which may be obtained from IP header (length field value) and manipulating the value in an appropriate manner, e.g. by subtracting from it the amount corresponding the length of the header information (non data). The derived length value corresponding to the real payload is added to SEQ counter values for both the client device and the host server and, finally, a value representing the ACK counter value is obtained, which is to be returned. In this manner it is possible to perform the acknowledgement locally in the transmitting end (i.e. local end), not in the receiving end (i.e. far end). In some cases the acknowledgement is not necessarily performed e.g. when a data frame in question carries so called TCP options (e.g. SACK or Time Stamp information). Worthwhile to mention is that in the data frame to be returned all protocol fields shall be correctly defined in order to generate a valid new frame and acknowledgement.

In addition to the above there is need to take into account how the device in question is connected to the network, e.g. as regards to L3 inline, L2 inline, L2 mirror (span) and L2/L3 PFS (Packet Flow Switches)/PFB (Packet Flow Brokers)/packet transfer systems. Specifically speaking there is need to correctly set at least MAC address and IP address fields so that routing and switching may be performed and disturbances are mitigated at least in part.

Regarding step 330:

In response to the detection that a predetermined piece of information is detected in the data traffic, such as a transmit of a predetermined signal from the entity whose data traffic the network device 210 is configured to monitor, the network device 210 may be configured to generate an acknowledgement complying an acknowledgement of a communication protocol used in the communication, such as an acknowledgment according to TCP, and transmit the acknowledgment to the entity whose data traffic the network device 210 is configured to monitor.

Figure 4:
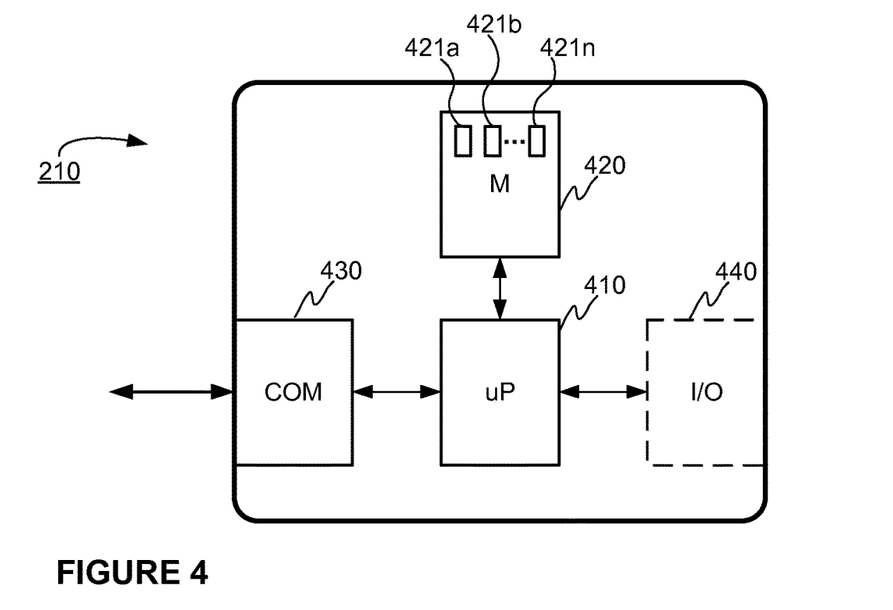
FIG. 4 schematically illustrates a network device according to an embodiment of the invention.

FIG. 4 illustrates schematically a network device 210 according to an example of the invention. The network device 210 may be configured to implement the method for controlling the communication as described at least in part. The execution of the method may be achieved by arranging the processor 410 to execute at least some portion of computer program code 421a-421n stored in a memory 420 causing the processor 410, and, thus, the network device 210, to implement one or more method steps as described. Hence, the processor 410 may be arranged to access the memory 420 and to retrieve and to store any information therefrom and thereto. Moreover, the processor 410 may be configured to control the communication through one or more communication interface 430 with any external unit, such as with at least one of the following: switching device, routing device, host server 120 or client device 110. Hence, the at least one communication interface 430 may be arranged to implement, possibly under control of the processor 410, a corresponding communication protocol in question. Further, the network device 210 may comprise one or more input/output devices 440 for inputting and outputting information. Such input/output devices may e.g. be keyboard, buttons, touch screen, display, loudspeaker and so on. In some implementation of the network device 210 at least some of the input/output devices may be external to network device 210 and coupled to it either wirelessly or in a wired manner. For sake of clarity, the processor herein refers to any unit or a plurality of units suitable for processing information and control the operation of the network device 210 in general at least in part, among other tasks. The mentioned operations may e.g. be implemented with a microcontroller solution with embedded software. Similarly, the invention is not limited to a certain type of memory only, but any memory unit or a plurality of memory units suitable for storing the described pieces of information, such as portions of computer program code and/or parameters usable in the context of the present method, may be applied in the context of the present invention. Even if it is disclosed that the method may be implemented with one network device 210, it may also be arranged that implementation of the method is performed in multiple network devices 210 operatively coupled to each other either directly or indirectly as a distributed implementation. In case the network device 210 is integrated with to another network entity the functionality of the network device 210 is advantageously implemented in the manner as described.

The network device 210 referred in describing at least some aspects of the present invention may be a stand-alone device, or a plurality of stand-alone device, monitoring the data traffic as described either so that the data traffic goes through the network device 210 or so that it accesses the data traffic from a predetermined port, such as from a mirror port, of an applicable network node, such as a switch. Furthermore, the functionality of the network device 210, as described, may be implemented in some network node residing in the communication channel under monitoring. For example, the described functionality may be implemented in one or more switches, in one or more routing devices, in one or more packet brokers/packet flow switches, in one or more firewalls, and so on. In addition, the functionality may be implemented and executed in at least one of the following: the client device 110, the server 120.

The present invention relates also a computer program product comprising at least one computer-readable storage medium having computer-executable program code instructions stored therein for performing the method, or at least some steps of it, as described when the computer program product is executed on a computer. The computer may e.g. refer to a network device as described above.

Above it is described a solution by means of which it is possible to accelerate communication between at least two parties over TCP, or a similar communication protocol, in which the communication parties acknowledge a receipt of data from the other party. Especially, in situations where the communicating parties locate distantly from each other the acknowledging may turn out to be a limiting factor in the communication. The solution is based on an idea in which a functionality detecting predetermined data traffic is implemented at the end of at least one communicating party and in response to detection the functionality generates an acknowledgement to the communication party before any acknowledgements, if any, is received from the destination party of the data traffic. In this manner the communication between the parties may be accelerated since the acknowledgement is performed locally at the end of the at least one communicating party.

One further advantage of the present invention as described is that it also improves an overall security of the communication system, because it prevents a possibility to manipulate the TCP ACK frames transmitted between the communicating parties. This is achieved because the acknowledgements having an importance are transmitted locally. Moreover, as the acknowledgements are received in double, i.e. the acknowledgement from receiver of a data frame and the local acknowledgement, it is possible to develop sophisticated monitoring solutions in order to improve the security.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for controlling a communication of a first communication device to a second communication device over a communication network with a network device configured to transmit acknowledgments to the first communication device, the method comprises:

monitoring, by the network device residing locally at a first end with the first communication device, data traffic to the communication network from the first communication device, the network device is arranged to monitor the data traffic through a mirror port of a network node, the network node residing locally at the first end with the first communication device in a communication channel in which the data traffic is conveyed and the mirror port of the network node is arranged to mirror the data traffic to the network device, the network device is arranged in parallel with the communication channel for monitoring the data traffic through the mirror port of the network node, in response to local detection of at least one predetermined piece of information in at least one data frame in the data traffic, generating, by the network device residing locally at the first end with the first communication device, an acknowledgment to the first communication device, the acknowledgement complying with a communication protocol used for the communication, the acknowledgement is generated to correspond to an acknowledgement expected from the second communication device, and transmitting, by the network device residing locally at the first end with the first communication device, the generated acknowledgement to the first communication device for indicating a delivery of the data traffic to the second communication device.

2. The method of claim 1, wherein the at least one predetermined piece of information is at least one value of at least one data field in the at least one data frame.

3. The method of claim 2, wherein the local detection is performed by comparing the at least one value of the at least one data field to at least one comparison value and in response to local detection that the at least one value corresponds to the comparison value, the local detection is indicated.

4. The method of claim 1, wherein an acknowledgement generated by the second communication device in response to a receipt of data traffic from the first communication device is detected, by the network device, from a data traffic intended to the first communication device.

5. The method of claim 4, wherein the acknowledgement generated by the second communication device is filtered out from the data traffic intended to the first communication device.

6. A network device for controlling a communication of a first communication device to a second communication device over a communication network, the network device configured to transmit acknowledgments to the first communication device, the network device comprising:

at least one processor;

at least one memory including computer program code;

the at least one memory and the computer program code configured to, with the at least one processor, cause the network device to perform:

monitor data traffic to the communication network from the first communication device, the network device residing locally at a first end with the first communication device is arranged to monitor the data traffic through a mirror port of a network node, the network node residing locally at the first end with the first communication device in the communication channel in which the data traffic is conveyed and the mirror port of the network node is arranged to mirror the data traffic, the network device is arranged in parallel with the communication channel for monitoring the data traffic through the mirror port of the network node, generate, in response to local detection of at least one predetermined piece of information in at least one data frame in the data traffic, an acknowledgment to the first communication device, the acknowledgement complying with a communication protocol used for the communication, the acknowledgement is generated to correspond to an acknowledgement expected from the second communication device, and transmit the generated acknowledgement to the first communication device for indicating a delivery of the data traffic to the second communication device.

7. The network device of claim 6, wherein the network device is configured to perform the local detection by comparing at least one value of the at least one data field to at least one comparison value and in response to local detection that the at least one value corresponds to the comparison value to indicate the local detection.

8. The network device of claim 6, wherein the network device is configured to detect an acknowledgement generated by the second communication device in response to a receipt of data traffic from the first communication device from a data traffic intended to the first communication device.

9. The network device of claim 8, wherein the network device is configured to filter out the acknowledgement generated by the second communication device from the data traffic intended to the first communication device.

10. A computer program product comprising at least one non-transitory computer-readable storage medium having computer-executable program code instructions stored therein that, when the computer program product is executed on one or more computing devices, directs the one or more computing devices to:

monitor data traffic to a communication network from a first communication device by a network device residing locally at a first end with the first communication device, the network device is arranged to monitor the data traffic through a mirror port of a network node, the network node residing locally at the first end with the first communication device in the communication channel in which the data traffic is conveyed and the mirror port of the network node is arranged to mirror the data traffic to the network device, the network device is arranged in parallel with the communication channel for monitoring the data traffic through the mirror port of the network node, the network device configured to transmit acknowledgments to the first communication device, generate, by the network device residing locally at the first end with the first communication device, in response to local detection of at least one predetermined piece of information in at least one data frame in the data traffic, an acknowledgment to the first communication device, the acknowledgement complying with a communication protocol used for the communication, the acknowledgement is generated to correspond to an acknowledgement expected from a second communication device, and transmit, by the network device residing locally at the first end with the first communication device, the generated acknowledgement to the first communication device for indicating a delivery of the data traffic to a second communication device.

11. The computer program product of claim 10, wherein the at least one predetermined piece of information is at least one value of at least one data field in the at least one data frame.

12. The computer program product of claim 11, wherein the local detection is performed by comparing the at least one value of the at least data field to at least one comparison value and in response to local detection that the at least one value corresponds to the comparison value, the local detection is indicated.

13. The computer program product of claim 10, wherein an acknowledgement generated by the second communication device in response to a receipt of data traffic from the first communication device is detected, by a network device, from a data traffic intended to the first communication device.

14. The computer program product of claim 13, wherein the acknowledgement generated by the second communication device is filtered out from the data traffic intended to the first communication device.

15. The computer program product of claim 10, wherein one or more computer devices comprise the network device residing at an end of the first communication device.

* * * * *